(12) United States Patent
Pan

(10) Patent No.: US 8,253,274 B2
(45) Date of Patent: Aug. 28, 2012

(54) POWER SUPPLY SYSTEM FOR ELECTRICAL APPLIANCE

(76) Inventor: Yang Pan, Shanghai (CN)

( * ) Notice: Subject to any disclaimer, the term of this patent is extended or adjusted under 35 U.S.C. 154(b) by 81 days.

(21) Appl. No.: 12/577,152

(22) Filed: Oct. 10, 2009

(65) Prior Publication Data

US 2011/0084555 A1   Apr. 14, 2011

(51) Int. Cl.
H02J 9/00 (2006.01)
(52) U.S. Cl. .......................... 307/64; 307/126
(58) Field of Classification Search ............ 307/26, 307/18, 64, 130; 700/286, 295, 297
See application file for complete search history.

(56) References Cited

U.S. PATENT DOCUMENTS

| | | | |
|---|---|---|---|
| 4,718,233 A | 1/1988 | Barrett | |
| 5,082,450 A * | 1/1992 | Warren et al. | 439/102 |
| 5,493,155 A * | 2/1996 | Okamoto et al. | 307/45 |
| 6,678,176 B2 | 1/2004 | Lumsden | |
| 6,761,581 B2 * | 7/2004 | Takehara et al. | 439/502 |
| 7,145,265 B2 * | 12/2006 | McNulty et al. | 307/44 |
| 7,893,560 B2 * | 2/2011 | Carter | 307/64 |
| 2002/0117902 A1 * | 8/2002 | Evers et al. | 307/130 |
| 2002/0171391 A1 | 11/2002 | Batts-Gowins | |
| 2003/0051476 A1 | 3/2003 | Reno | |
| 2006/0087800 A1 * | 4/2006 | Savage | 361/601 |
| 2007/0013340 A1 | 1/2007 | Mattichak | |
| 2007/0221267 A1 | 9/2007 | Fornage et al. | |
| 2007/0293059 A1 * | 12/2007 | Yang et al. | 439/4 |
| 2007/0296276 A1 | 12/2007 | Blackman | |
| 2008/0029153 A1 | 2/2008 | Margalit | |
| 2008/0143188 A1 | 6/2008 | Adset et al. | |
| 2009/0027932 A1 * | 1/2009 | Haines et al. | 363/95 |
| 2010/0164291 A1 * | 7/2010 | Pichkur | 307/72 |

* cited by examiner

Primary Examiner — Daniel Cavallari

(57) ABSTRACT

A power supply system is disclosed. The system comprises an AC power source from a power grid and a DC power source from an alternative energy source. The alternative energy source is a solar system in the preferred embodiment. The system provides a means of supplying the electrical appliance the DC power from the solar system with the higher priority. According to one embodiment of the present invention, a switch controlled by a controller provides a means of switching the power supply in between the two power sources without disrupting the operation of the appliance. According to another embodiment, a voltage regulator combines power generated from both sources to supply the power for the appliance with consuming the DC power from the solar system as the priority source.

14 Claims, 8 Drawing Sheets

POWER SUPPLY SYSTEM FOR ELECTRICAL APPLIANCE

CROSS-REFERENCE TO RELATED APPLICATIONS

Not applicable.

BACKGROUND

1. Field of Invention

This invention relates to an electrical appliance, specifically to a power supply system including an AC source from a power grid and a DC source from an alternative energy generation system for powering an electrical appliance.

2. Description of Prior Art

In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing.

Furthermore, the electrical utility industry has for some time labored under the problem of supplying cost effective power to comply system peak-demand period requirements. The concept of peak-demand power supplementation is not new. A number of systems have been tested and implemented over years based upon batteries, hydroelectric, and combustion turbine. Each of the systems, by nature or by implementation, has had problems. Some are expensive and others are not acceptable environmentally.

Solar systems have been used with gained popularity to resolve at least partially the peak-demand issue of the power grid. A solar system may convert generated DC electricity from solar panels into AC electricity and be used to power electrical appliance. The generated DC power may be purchased by a power grid company after it is converted into AC power by utilizing an inverter. Over the years inverters have progressed from electromechanical to semiconductor devices. The use of the inverters not only causes the loss of electrical power but also the increase of overall cost of the solar system.

It is desirable to have a system and method for utilizing the solar energy to supplement the peak demand of the power grid while eliminating the use of the inverters to reduce the cost of employing of solar systems.

SUMMARY OF THE INVENTION

It is therefore an object of the present invention to provide a cost effective method for utilizing solar energy for electrical appliances by eliminating the use of high cost inverters.

It is another object of the present invention to provide an improved power supply system for an electrical appliance that consumes DC power from an alternative energy source directly whenever it is available while it uses AC power from the power grid as a backup or supplementary power source.

The power supply system based upon the present inventive concept comprises a first means of power supply based upon AC power from the power grid and a second means of power supply based upon DC power generated from an alternative energy source such as the solar system. A switch is used to switch in between the DC and the AC sources controlled by a controller. The controller measures the generated DC power regularly. The DC power generated by the alternative energy generation source is consumed as the first priority while the AC power from the power grid is used as a backup or supplementary source.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
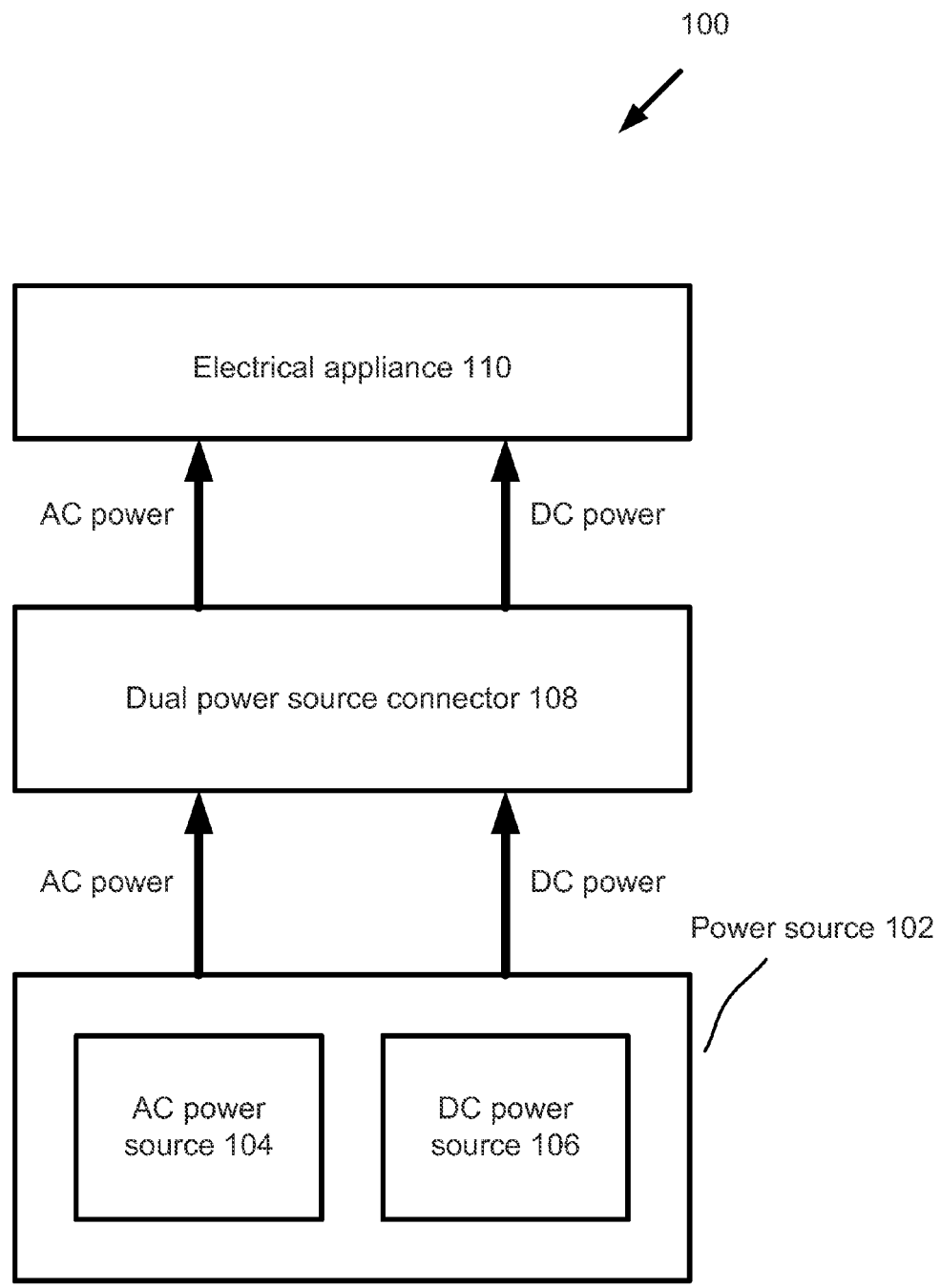
FIG. 1 is a schematic diagram of a power supply system for an electrical appliance.

FIG. 1 is a schematic diagram of a power supply system for an electrical appliance. The system 100 comprises a power source 102 including an AC power source 104 and a DC power source 106. A dual power source connector 108 directs power from the power source 102 to an electrical appliance 110. In an exemplary case, the appliance 110 is a home electronic appliance such as a home audio system. The arrows in FIG. 1 indicate the direction of the power flow.

Figure 2:
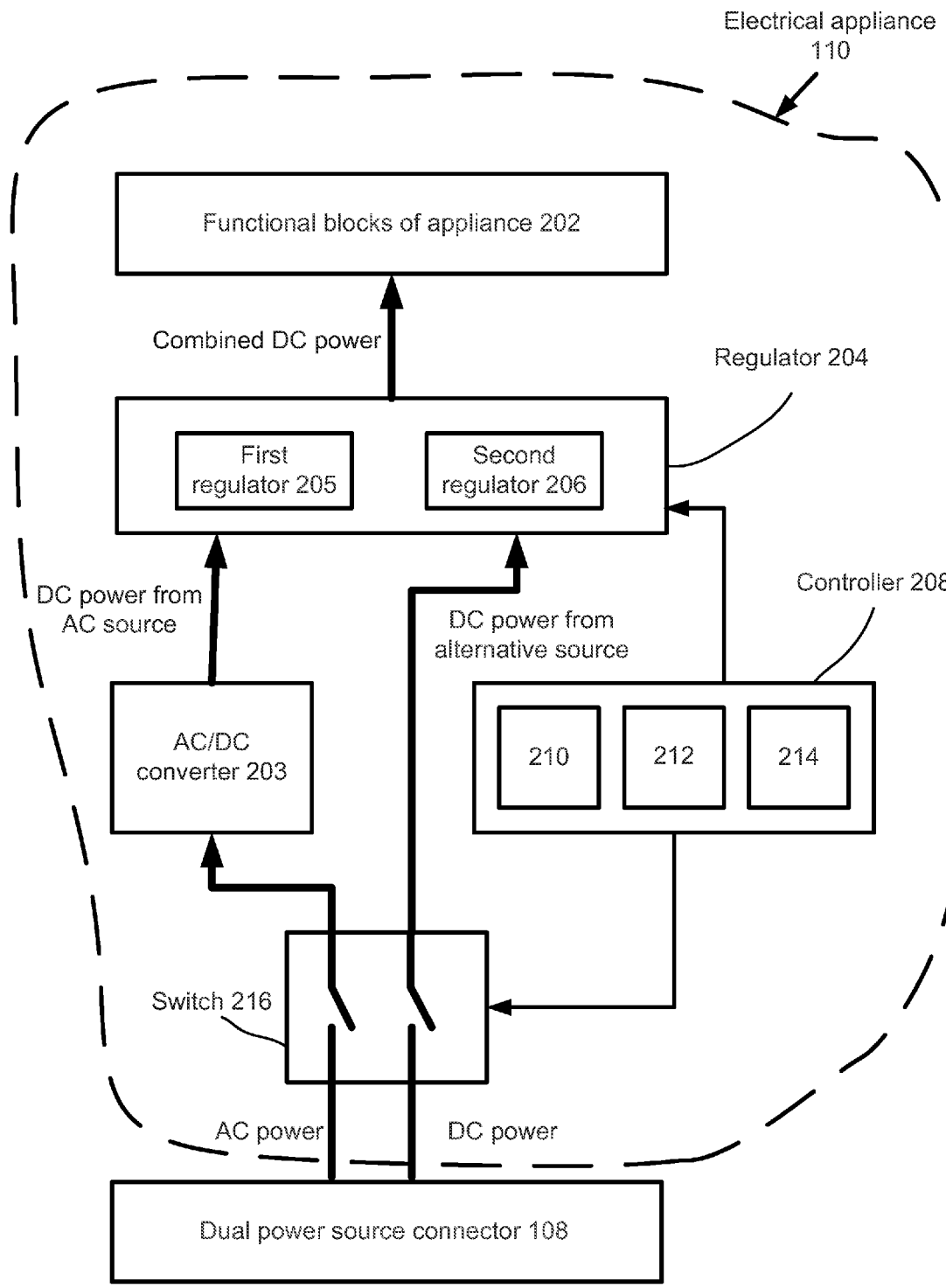
FIG. 2 is a functional block diagram of an electrical appliance with a dual power source supply system.

Functional blocks of the appliance 110 are further illustrated in FIG. 2. Block 202 represents all functional blocks of the appliance except for the power supply system. The power supply system comprises an AC path including an AC/DC converter 203 and a voltage regulator 204. The regulator 204 comprises a first voltage regulator 205 for regulating the output voltage from the AC/DC converter 203 for the operation of 202. The system further comprises a DC path from the alternative energy generation system connecting to the voltage regulator 204. The regulator 204 comprises a second voltage regulator 206. The output DC power from an alternative energy source may require further regulation to be consumed by the functional blocks 202. The alternative energy source is a solar system in the preferred embodiment of the present invention.

According to one aspect of the present invention, one of the two power paths is selected by a controller 208 through a switch 216. The controller 208 further comprises a measurement unit 210, a processor 212 and a battery 214. The measurement unit 210 is used to measure the generated DC power from the solar system. The controller receives the measurement results and decides if the DC or the AC power source is connected for powering the appliance. The switch 216 connects to the dual power source connector 108.

According to another aspect of the present invention, both of the power paths are connected to the functional blocks of the appliance 202 through the voltage regulator 204. The controller 208 is connected to the voltage regulator 204 to provide a means of controlling its operation. The available DC power from the alternative energy source is measured by 210 on a regular base. The required additional power is drawn from the AC source controlled by the controller 208. The voltage regulator 204 combines the regulated DC power from the alternative energy source and the regulated DC power converted from the AC/DC converter 203 before they are delivered to 202. The AC power is used as the supplementary power for the DC power whenever the DC power alone is insufficient to power the operations of the functional blocks of the appliance. The required power for the appliance may be pre-stored in a memory of the controller 208 or is determined on a real time base. The method is known in the prior art for determining required power consumption for an appliance.

Figure 3:
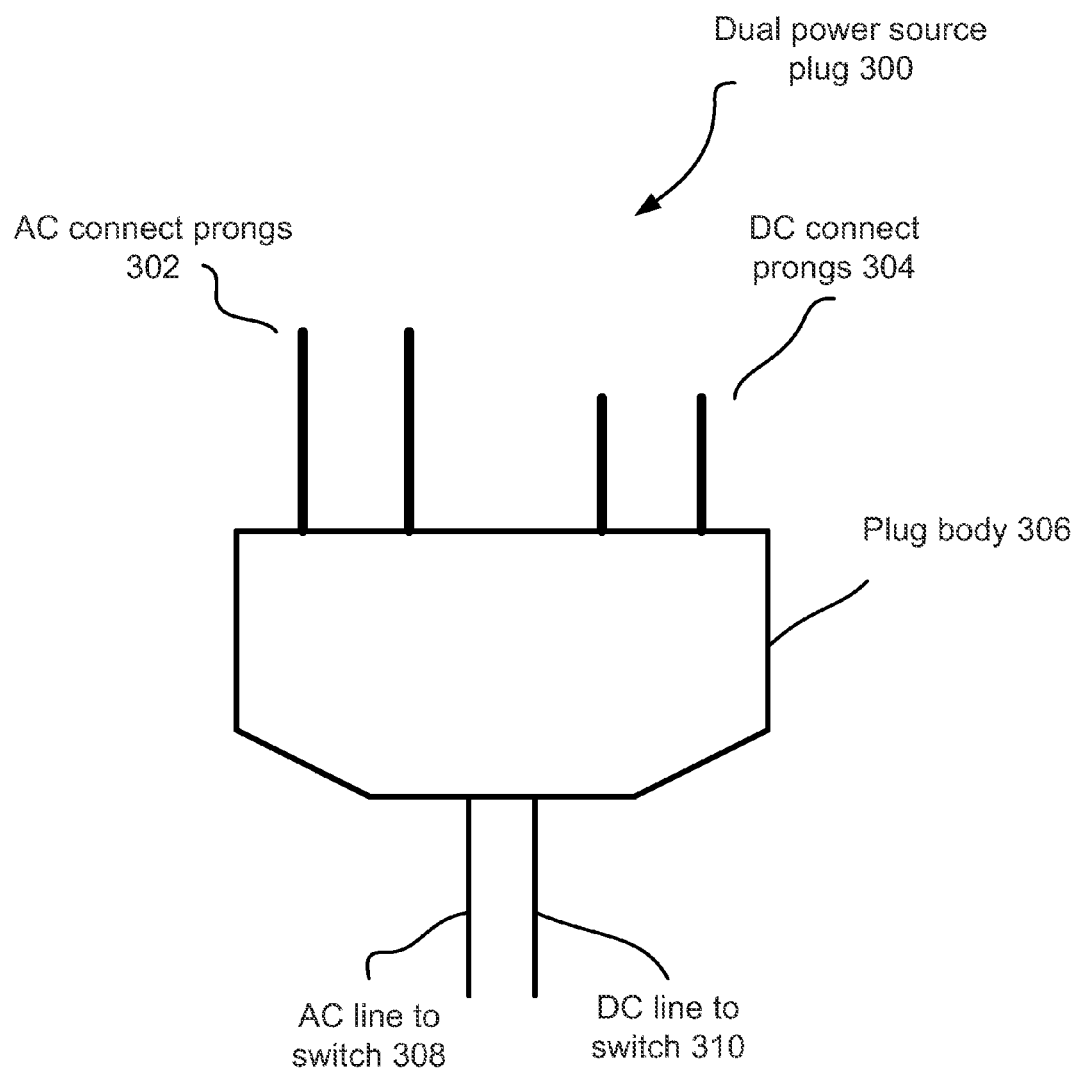
FIG. 3 is a schematic diagram illustrating an exemplary implementation of a dual power source plug.

FIG. 3 is a schematic diagram illustrating an exemplary implementation of a dual power source connector as a plug. The plug 300 comprises a pair of long connect prongs 302 for connecting to the AC power source 104 and a pair of short connect prongs 304 for connecting to the DC power source 106. 302 and 304 are electrically insulated to satisfy all safety requirements. The connect prongs are connected to the power sources through multiple slots of a socket. 306 is the body for the plug 300. The plug 300 further comprises a group of power lines 308 to connect to the AC power source 104 and another group of power lines 310 to connect to the DC power source 106. It should be noted that there are numerous variations of the implementations of the plug within the scope of the present inventive concept. For example, 302 may be more than two connect prongs as illustrated in FIG. 3. There are also different ways to arrange 302 and 304. It is also not necessary that AC and DC prongs have different lengths. They may be differentiated by other means such as by different shapes and/or orientations.

Figure 4:
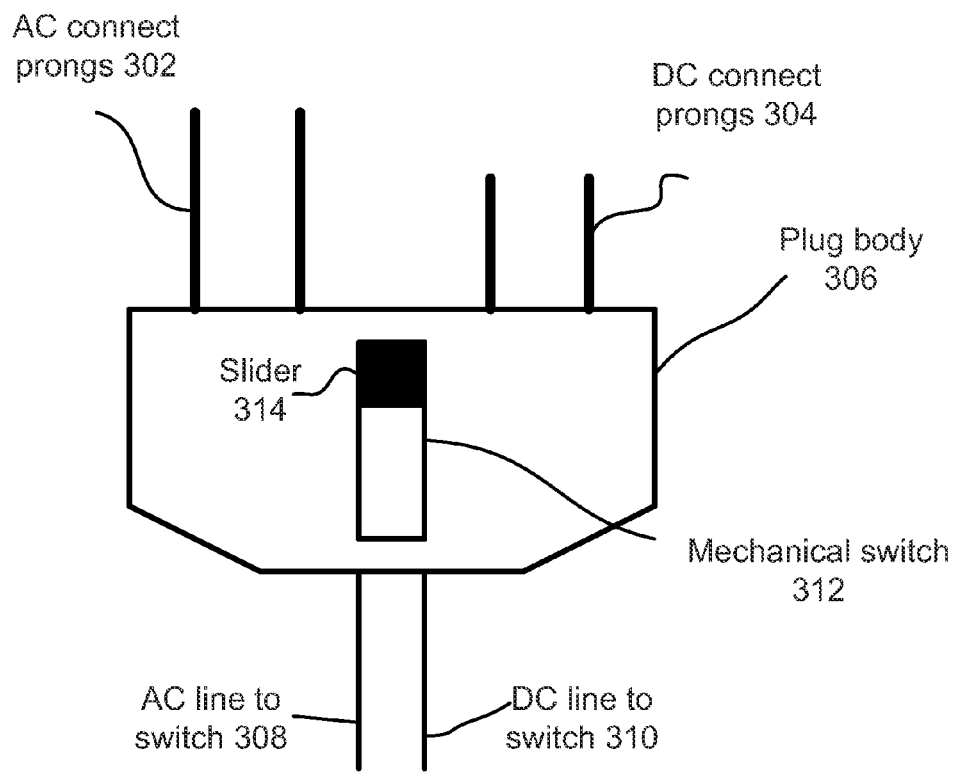
FIG. 4 is a schematic diagram illustrating a conversion of the plug for the dual power sources to for the single power source. The conversion is controlled by a mechanical switch.
Figure 4:
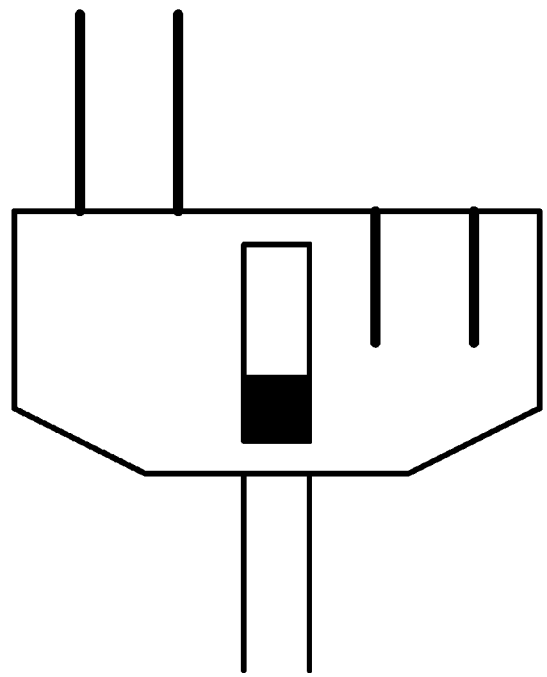

FIG. 4 is a schematic diagram illustrating a conversion from a dual power source plug to a single power source plug controlled by a mechanical switch 312 with a movable slider 314. When the slider 314 is pushed down by a user, the prongs 304 for the DC power source are then retrograde into the body of the plug. The similar implementation can be found in a conventional adapter for travelers. The present implementation is with a novel application for the device to select between the AC and the DC power sources.

Figure 5:
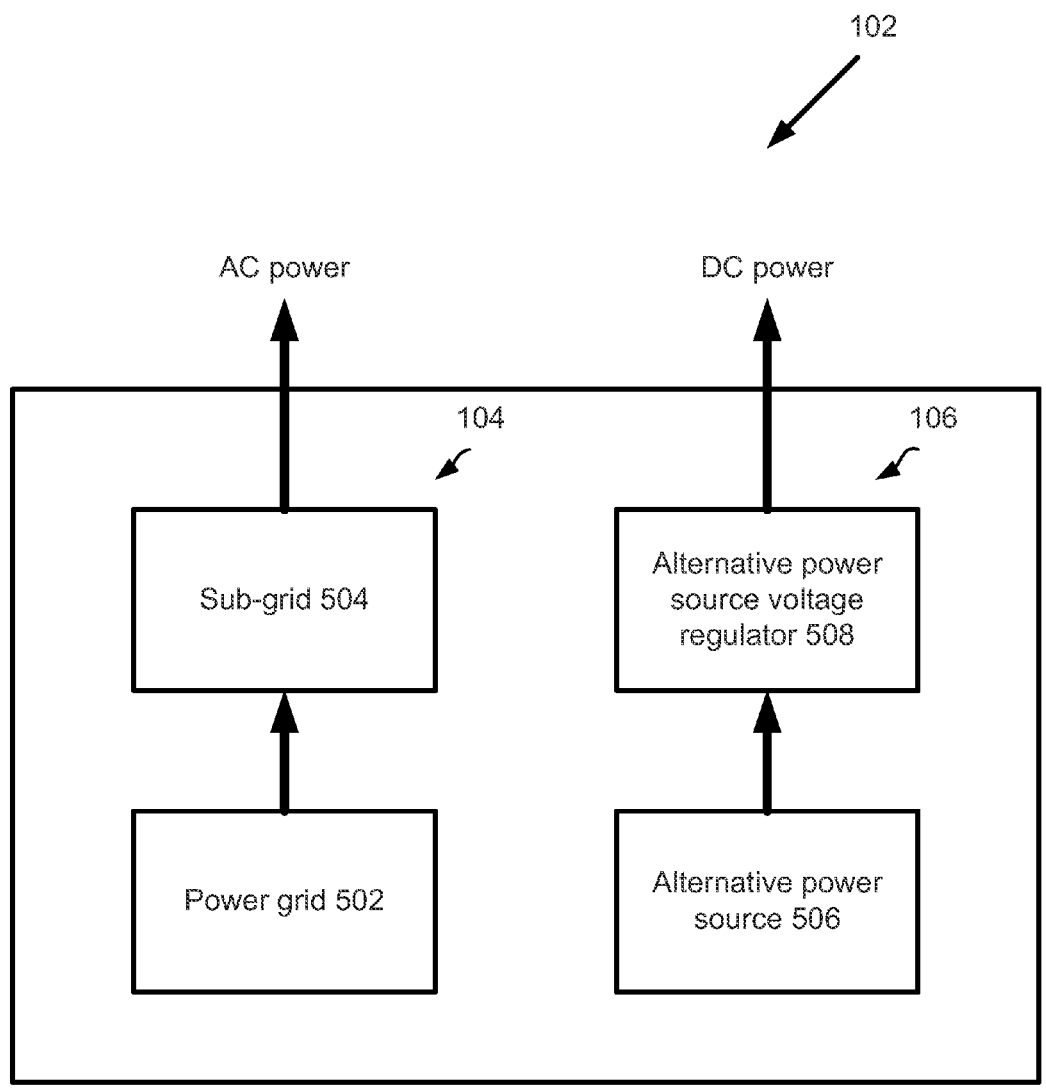
FIG. 5 is a schematic diagram of the power source illustrating that the AC power from the power grid and the DC power from an alternative energy source.

FIG. 5 is a schematic diagram illustrating that the AC power is delivered from the power grid and the DC power is delivered from an alternative energy source. The power source 102 comprises the AC power source 104 including a power grid 502 and a sub-grid 504 as known in prior art. The power source 102 further comprises the DC power source 106 including an alternative power source 506 and an alternative power source voltage regulator 508. In the preferred embodiment, 506 is a solar system. The solar system may comprise multiple solar panels. In one implementation, the solar system may be installed on the top of a roof for a house. The solar system converts the sun radiations into DC electricity based upon the well know photovoltaic effects. The maximum DC power is typically generated at noon which corresponds to the peak-demand of the electrical utility. By eliminating the inverters, the DC power is directly consumed by the electrical appliance at lower cost. The present invention indeed provides a low cost way to utilize the generated electricity from solar systems. It should be noted that the system based upon the present invention is best suited for the applications where the power grid is available. The appliance consumes DC power generated by solar system whenever it is available to save overall utility cost.

Figure 6A:
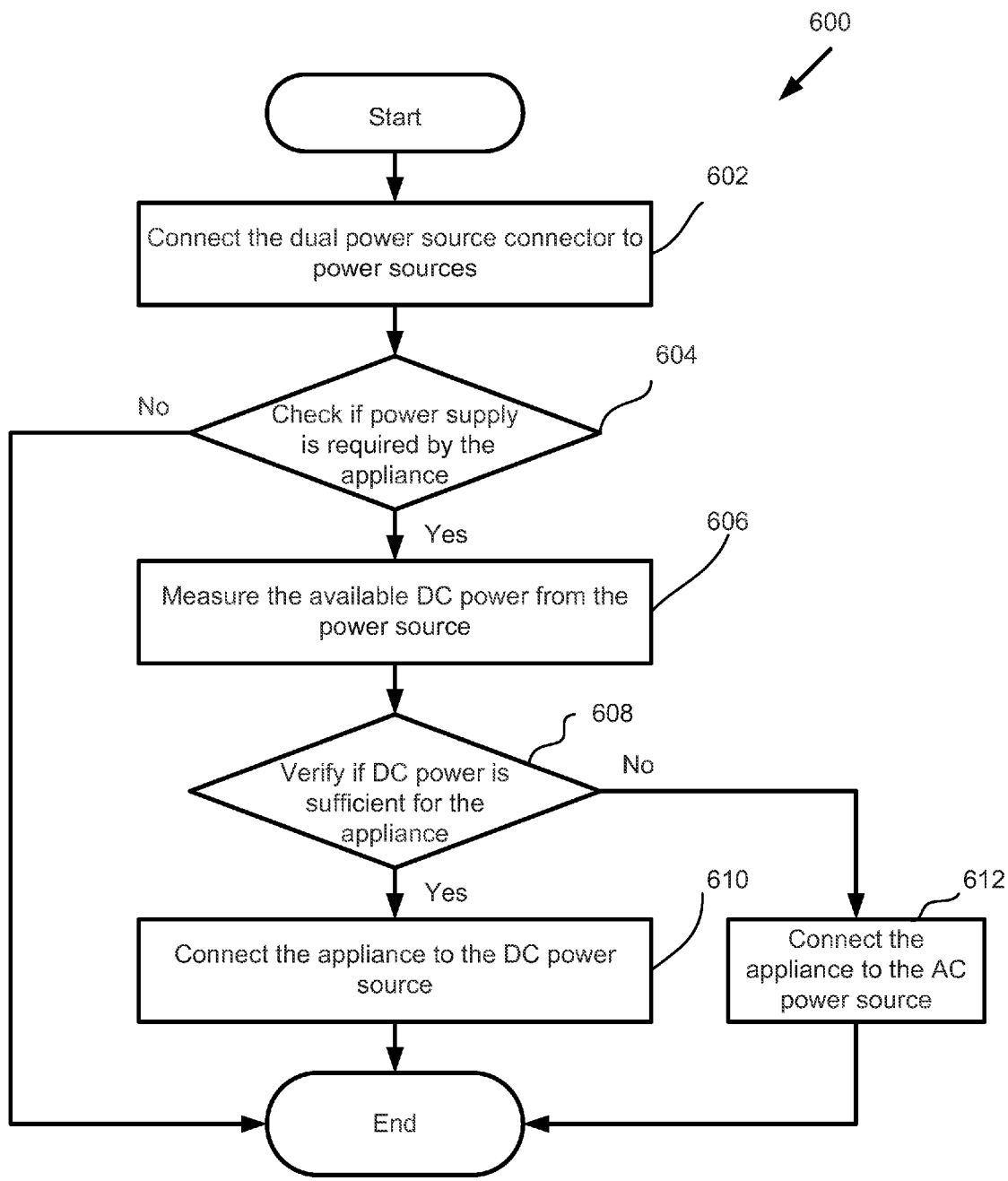
FIG. 6A is a flow diagram depicting steps of a process illustrating operation of the dual power source supply system based upon one embodiment. According to the embodiment, the DC source is switched off when the measured DC power is below the threshold value.

FIG. 6A is a flow diagram depicting steps of a process illustrating operation of the dual power source supply system. Process 600 starts with step 602 that the dual power source connector 108 is connected to the power source 102 by, in an exemplary case, plugging the plug 300 into a plurality of slots of a socket on a wall. In step 604, the controller checks if the power supply is required by the appliance as a result of an user switching on the device. If the result in the step 604 is positive, the DC power generated from the alternative power source 506 is measured by the measurement unit 210. The switch 216 connects the controller 208 to the DC power source 104 during the step. In step 608, the controller 208 verifies if the generated DC power is sufficient for powering the appliance. If the DC power is sufficient, the DC power source is connected in step 610 to the appliance for powering the operation. If the DC power is insufficient, the appliance is then connected to the conventional AC power source 104 in step 612 according to one embodiment of the present invention.

Figure 6B:
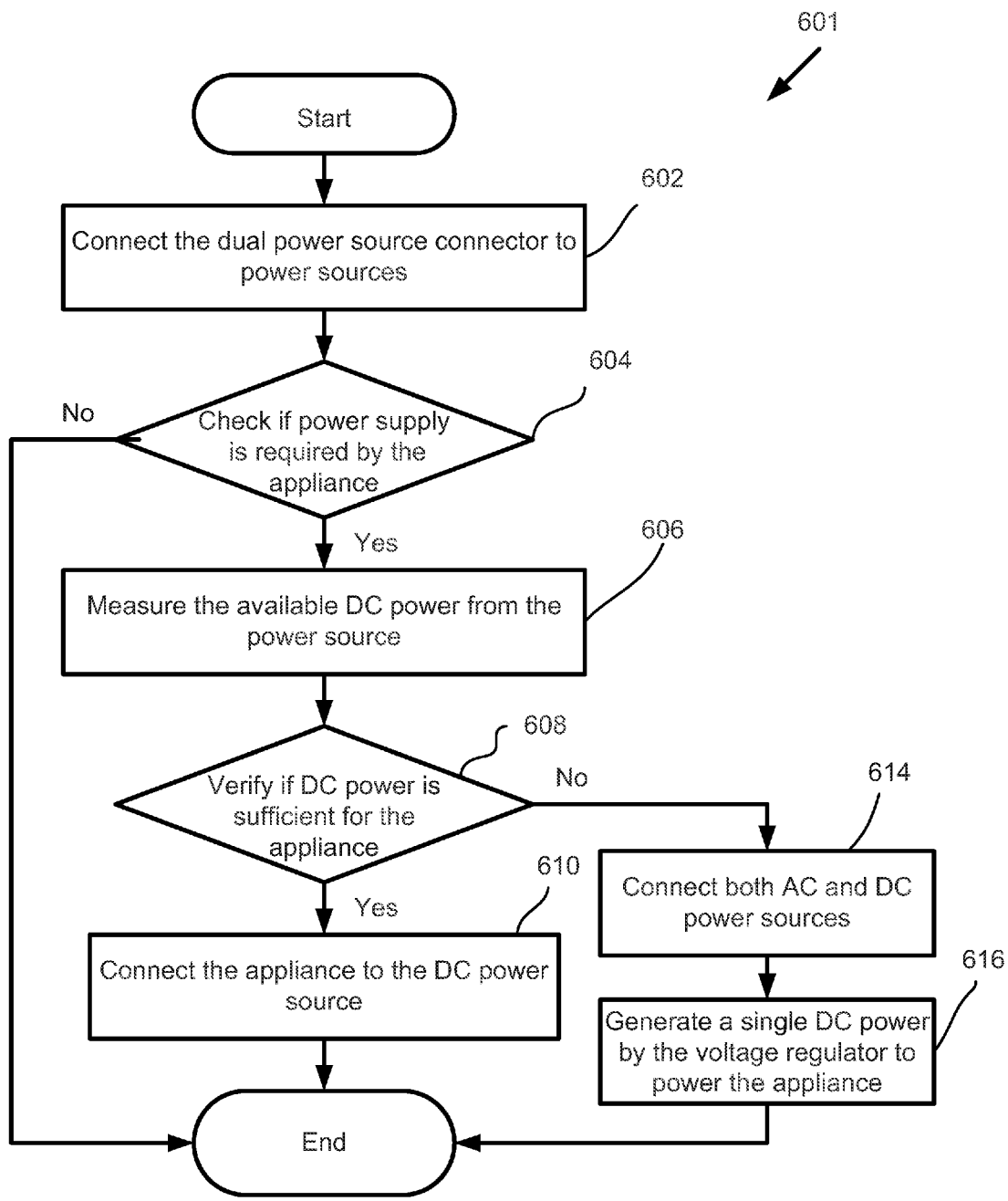
FIG. 6B is a flow diagram depicting steps of a process illustrating operation of the dual power source supply system based upon another embodiment. According to the embodiment, the generated DC power is always consumed and the AC power is a supplementary source to the DC one.

Another embodiment of the present invention is depicted in FIG. 6B by a process 601. The appliance is connected to the DC power source 106 if the measured power is verified by the controller 208 as sufficient for powering the appliance. According to the embodiment, even if the DC power is insufficient for powering the appliance, the generated DC power is still consumed by the appliance. Both DC and AC power sources are connected in step 614. A single regulated DC power is generated by the voltage regulator 204 controlled by 208 in step 616. The available DC power from the alternative energy generation system is measured on a regular base. The required additional power is drawn from the AC source controlled by the controller 208. The power consumption for the appliance is therefore a sum of the generated DC power from the alternative power generation system and the AC power from the power grid. The operation is controlled by the controller.

Figure 7:
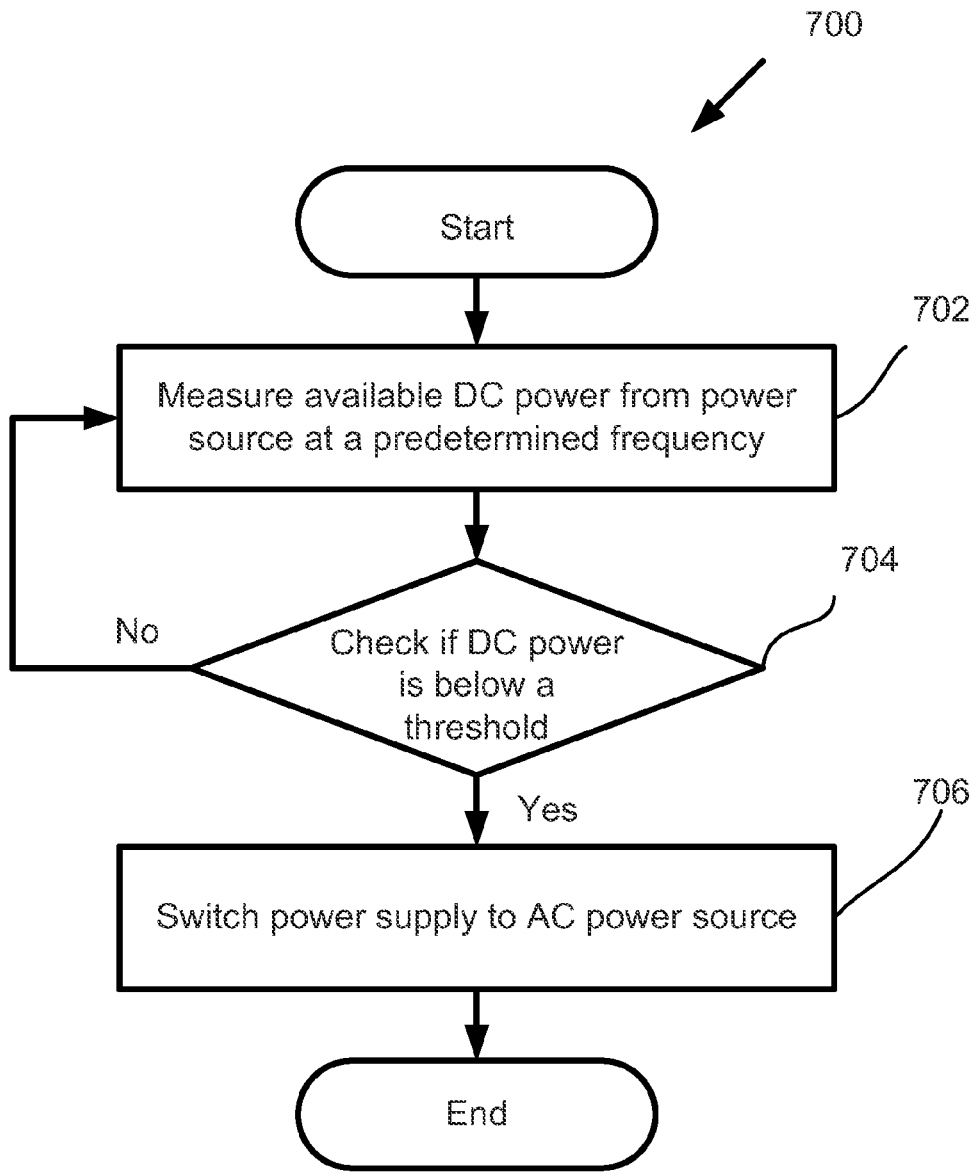
FIG. 7 is a flow diagram depicting steps of a process illustrating operation of the dual power source supply system at an operational phase.

According to the embodiment described by the process 600, the DC power generated by the alternative energy generation system may vary. For example, the DC power generated by the solar panels may change if the received sun radiation is reduced due to the weather conditions. It is therefore necessary to monitor the available DC power on a regular base to prevent appliance malfunction. FIG. 7 is a flow diagram depicting steps of a process illustrating operation of the dual power source supply system during an operational phase. Process 700 starts with step 702 that available DC power is measured in a predetermined frequency. If the generated DC power is verified as below a threshold value in step 704, the switch 216 switches the appliance to the AC power source 104.

The invention claimed is:

1. A power supply system for an electrical appliance comprising:
   (a) an AC power path for receiving AC power from a power grid, wherein said AC path further comprising an AC/DC converter and a first switch;
   (b) a DC power path for receiving DC power from an alternative energy generation system, wherein said DC path further comprising a second switch;
   (c) a regulator including a first regulator in said AC power path and a second regulator in said DC power path, wherein said regulator further comprising a single DC power output that powers functional blocks of said electrical appliance; and
   (d) a controller for controlling operations of said power supply system including switching on said first and said second switches,
      wherein said controller further comprises a measurement unit for measuring the DC power, the controller uses the measurement results to control the first and second switches to connect the DC and AC power source for powering the appliance.

2. The system as recited in claim 1, wherein said regulator is controlled by said controller.

3. The system as recited in claim 1, wherein said controller further comprising a means of switching on said DC power path and switching off said AC power path if said DC power is sufficient for operation of said electrical appliance.

4. The system as recited in claim 1, wherein said controller further comprising a means of switching off said DC power path and switching on said AC power path if said DC power is below a predetermined threshold value.

5. The system as recited in claim 1, wherein said controller further comprising a means of switching on said DC power path and switching on said AC power path if said DC power is insufficient for operation of said electrical appliance.

6. The system as recited in claim 1, wherein said controller further comprising a measurement unit for measuring said DC power from said alternative energy generation system.

7. The system as recited in claim 1, wherein said controller connects said measurement unit to the DC power path through said switch to measure the DC power from said alternative energy generation system in a predetermined frequency.

8. The system as recited in claim 1, wherein said controller further comprising a battery.

9. The system as recited in claim 1, wherein said controller further comprising a processor.

10. The system as recited in claim 1, wherein said alternative energy generation system further comprising a solar system.

11. The system as recited in claim 1, wherein said power supply system further comprising a dual power source connector in single piece, wherein said connector further comprising a first group of connect prongs for connecting to said AC path to AC power source and a second group of connect prongs for connecting said DC path to said alternative energy generation system.

12. The system as recited in claim 11, wherein said connector further comprises means of retracting the second group of connect prongs for the DC power into a body of the connector.

13. The system as recited in claim 1, wherein said electrical appliance further including a home audio system.

14. The system as recited in claim 1, wherein said controller further comprising a means of determining required DC power for operation of said electrical appliance, wherein said required DC power may either be pre-stored in a memory of said controller or be determined by said controller in a real time base.

* * * * *